(12) United States Patent
Boulanger et al.

(10) Patent No.: US 10,230,910 B2
(45) Date of Patent: *Mar. 12, 2019

(54) INFRARED CAMERA SYSTEM ARCHITECTURES

(71) Applicant: FLIR SYSTEMS, INC., Wilsonville, OR (US)

(72) Inventors: Pierre Boulanger, Goleta, CA (US); Theodore R. Hoelter, Goleta, CA (US); Barbara Sharp, Santa Barbara, CA (US); Eric A. Kurth, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/665,277

(22) Filed: Jul. 31, 2017

(65) Prior Publication Data

US 2017/0359526 A1 Dec. 14, 2017

Related U.S. Application Data

(63) Continuation of application No. 14/101,258, filed on Dec. 9, 2013, now Pat. No. 9,723,228, which is a
(Continued)

(51) Int. Cl.
*H04N 5/33* (2006.01)
*H04N 5/225* (2006.01)
(Continued)

(52) U.S. Cl.
CPC ............. *H04N 5/33* (2013.01); *G01J 5/522* (2013.01); *H04N 5/2257* (2013.01);
(Continued)

(58) Field of Classification Search
None
See application file for complete search history.

(56) References Cited

U.S. PATENT DOCUMENTS 2,764,055 A 9/1956 Clemens et al.
5,128,796 A 7/1992 Barney et al.
(Continued)

FOREIGN PATENT DOCUMENTS

CA 2764055 7/2012
CN 2874947 2/2007
(Continued)

OTHER PUBLICATIONS

DARPA, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.
(Continued)

*Primary Examiner* — Anand S Rao
*Assistant Examiner* — Tyler B Edwards
(74) *Attorney, Agent, or Firm* — Haynes and Boone, LLP

(57) ABSTRACT

Various techniques are disclosed for providing an infrared imaging module that exhibits a small form factor and may be used with one or more portable devices. Such an infrared imaging module may be implemented with a housing that includes electrical connections that may be used to electrically connect various components of the infrared imaging module. In addition, various techniques are disclosed for providing system architectures for processing modules of infrared imaging modules. In one example, a processing module of an infrared imaging module includes a first interface adapted to receive captured infrared images from an infrared image sensor of the infrared imaging module. The processing module may also include a processor adapted to perform digital infrared image processing on the
(Continued)

captured infrared images to provide processed infrared images. The processing module may also include a second interface adapted to pass the processed infrared images to a host device.

20 Claims, 21 Drawing Sheets

Related U.S. Application Data continuation of application No. PCT/US2012/041739, filed on Jun. 8, 2012.

(60) Provisional application No. 61/495,888, filed on Jun. 10, 2011, provisional application No. 61/495,873, filed on Jun. 10, 2011, provisional application No. 61/495,879, filed on Jun. 10, 2011.

(51) Int. Cl.
  *G01J 5/52* (2006.01)
  *G01J 5/20* (2006.01)
  *G01J 5/00* (2006.01)
  *G01J 5/02* (2006.01)
  *H04N 5/235* (2006.01)
  *H04N 7/18* (2006.01)

(52) U.S. Cl.
  CPC ......... *H04N 5/2351* (2013.01); *H04N 5/2354* (2013.01); *H04N 5/332* (2013.01); *H04N 7/18* (2013.01); *G01J 5/00* (2013.01); *G01J 5/02* (2013.01); *G01J 5/20* (2013.01)

(56) References Cited

U.S. PATENT DOCUMENTS

| | | |
|---|---|---|
| 5,721,427 A | 2/1998 | White et al. |
| 5,994,699 A | 11/1999 | Akagawa |
| 6,297,794 B1 | 10/2001 | Tsubouchi et al. |
| 6,330,371 B1 | 12/2001 | Chen et al. |
| 6,348,951 B1 | 2/2002 | Kim |
| 6,396,543 B1 | 5/2002 | Shin et al. |
| 6,424,843 B1 | 7/2002 | Reitmaa et al. |
| 6,444,983 B1 | 9/2002 | McManus et al. |
| 6,633,231 B1 | 10/2003 | Okamoto et al. |
| 6,681,120 B1 | 1/2004 | Kim, II |
| 6,707,044 B2 | 3/2004 | Lannestedt et al. |
| 6,759,949 B2 | 7/2004 | Miyahara |
| 6,883,054 B2 | 4/2005 | Yamaguchi et al. |
| 6,911,652 B2 | 6/2005 | Walkenstein |
| 7,050,107 B1 | 5/2006 | Frank et al. |
| D524,785 S | 7/2006 | Huang |
| 7,084,857 B2 | 8/2006 | Lieberman et al. |
| 7,208,733 B2 | 4/2007 | Mian et al. |
| 7,263,379 B1 | 8/2007 | Parkulo et al. |
| 7,284,921 B2 | 10/2007 | Lapstun et al. |
| 7,296,747 B2 | 11/2007 | Rohs |
| 7,305,368 B2 | 12/2007 | Lieberman et al. |
| 7,321,783 B2 | 1/2008 | Kim, II |
| 7,333,832 B2 | 2/2008 | Tsai et al. |
| 7,377,835 B2 | 5/2008 | Parkulo et al. |
| 7,420,663 B2 | 9/2008 | Wang et al. |
| 7,453,064 B2 | 11/2008 | Lee |
| 7,470,902 B1 | 12/2008 | Kraemer et al. |
| 7,477,309 B2 | 1/2009 | Cuccias |
| 7,567,818 B2 | 7/2009 | Pylkko |
| 7,572,077 B2 | 8/2009 | Lapstun et al. |
| 7,575,077 B2 | 8/2009 | Priepke et al. |
| 7,579,592 B2 | 8/2009 | Kaushal |
| 7,595,904 B2 | 9/2009 | Lapstun et al. |
| 7,616,877 B2 | 11/2009 | Zarnowski et al. |
| 7,627,364 B2 | 12/2009 | Sato |
| 7,697,962 B2 | 4/2010 | Cradick et al. |
| 7,723,686 B2 | 5/2010 | Hannebauer |
| 7,725,141 B2 | 5/2010 | Su |
| 7,728,281 B2 | 6/2010 | Chen |
| 7,734,171 B2 | 6/2010 | Leonelli, Jr. |
| 7,735,974 B2 | 6/2010 | Silverbrook et al. |
| 7,747,454 B2 | 6/2010 | Bartfeld et al. |
| 7,760,919 B2 | 7/2010 | Namgoong |
| 7,761,114 B2 | 7/2010 | Silverbrook et al. |
| 7,773,870 B2 | 8/2010 | Naruse |
| 7,801,733 B2 | 9/2010 | Lee et al. |
| 7,805,020 B2 | 9/2010 | Trudeau et al. |
| 7,810,733 B2 | 10/2010 | Silverbrook et al. |
| 7,872,574 B2 | 1/2011 | Betts et al. |
| 7,900,842 B2 | 3/2011 | Silverbrook et al. |
| 7,903,152 B2 | 3/2011 | Kim, II |
| 7,947,222 B2 | 5/2011 | Bae et al. |
| 7,960,700 B2 | 6/2011 | Craig et al. |
| 8,049,163 B1 | 11/2011 | Granneman et al. |
| 8,153,980 B1 | 4/2012 | Brady et al. |
| 8,189,050 B1 | 5/2012 | Hughes et al. |
| 8,275,413 B1 | 9/2012 | Fraden et al. |
| 8,305,577 B2 | 11/2012 | Kivioja et al. |
| 8,345,226 B2 | 1/2013 | Zhang |
| 8,537,343 B2 | 9/2013 | Zhang |
| 8,781,420 B2 | 7/2014 | Schlub et al. |
| 8,825,112 B1 | 9/2014 | Fraden et al. |
| 9,723,228 B2 * | 8/2017 | Boulanger ............... H04N 5/33 |
| 2002/0006337 A1 | 1/2002 | Kimura et al. |
| 2002/0122036 A1 | 9/2002 | Sasaki |
| 2002/0135571 A1 | 9/2002 | Klocek et al. |
| 2002/0140542 A1 | 10/2002 | Prokoski et al. |
| 2002/0149600 A1 | 10/2002 | Van Splunter et al. |
| 2003/0007193 A1 | 1/2003 | Sato et al. |
| 2003/0060108 A1 | 3/2003 | Chu et al. |
| 2003/0093805 A1 | 5/2003 | Gin |
| 2003/0112871 A1 | 6/2003 | Demos |
| 2003/0122957 A1 | 7/2003 | Emme |
| 2003/0146975 A1 | 8/2003 | Joung et al. |
| 2003/0198400 A1 | 10/2003 | Alderson et al. |
| 2003/0223623 A1 | 12/2003 | Gutta et al. |
| 2004/0047518 A1 | 3/2004 | Tiana |
| 2004/0101298 A1 | 5/2004 | Mandelbaum et al. |
| 2004/0127156 A1 | 7/2004 | Park |
| 2004/0128070 A1 | 7/2004 | Schmidt et al. |
| 2004/0157612 A1 | 8/2004 | Kim, II |
| 2004/0165788 A1 | 8/2004 | Perez et al. |
| 2004/0169860 A1 | 9/2004 | Jung et al. |
| 2004/0200961 A1 | 10/2004 | Parrish et al. |
| 2004/0207036 A1 | 10/2004 | Ikeda |
| 2004/0211907 A1 | 10/2004 | Wellman et al. |
| 2004/0256561 A1 | 12/2004 | Beuhler et al. |
| 2005/0030314 A1 | 2/2005 | Dawson |
| 2005/0067852 A1 | 3/2005 | Jeong |
| 2005/0068333 A1 | 3/2005 | Nakahashi et al. |
| 2005/0089241 A1 | 4/2005 | Kawanishi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0247867 A1 | 11/2005 | Volgt et al. |
| 2005/0248684 A1 | 11/2005 | Machida |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2006/0023109 A1 | 2/2006 | Mabuchi et al. |
| 2006/0039686 A1 | 2/2006 | Soh et al. |
| 2006/0060984 A1 | 3/2006 | Wakabayashi et al. |
| 2006/0077246 A1 | 4/2006 | Kawakami et al. |
| 2006/0078215 A1 | 4/2006 | Gallagher |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |

(56) References Cited

U.S. PATENT DOCUMENTS

| | | |
|---|---|---|
| 2006/0154559 A1 | 7/2006 | Yoshida |
| 2006/0210249 A1 | 9/2006 | Seto |
| 2006/0234744 A1 | 10/2006 | Sung et al. |
| 2006/0240867 A1 | 10/2006 | Wang et al. |
| 2006/0279758 A1 | 12/2006 | Myoki |
| 2006/0285907 A1 | 12/2006 | Kang et al. |
| 2006/0290796 A1 | 12/2006 | Nikkanen et al. |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0103742 A1 | 5/2007 | Ernandes et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0247611 A1 | 10/2007 | Tamaki et al. |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0211916 A1 | 9/2008 | Ono |
| 2008/0218474 A1 | 9/2008 | Ahn et al. |
| 2008/0248833 A1 | 10/2008 | Silverbrook et al. |
| 2008/0252775 A1* | 10/2008 | Ryu .................. H04N 5/2253 348/374 |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0050806 A1 | 2/2009 | Schmidt et al. |
| 2009/0052883 A1 | 2/2009 | Lee et al. |
| 2009/0115877 A1 | 5/2009 | Verdant |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2010/0020229 A1 | 1/2010 | Hershey et al. |
| 2010/0066809 A1 | 3/2010 | Cormack et al. |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0283890 A1* | 11/2010 | Mizumura .......... H01R 13/639 348/374 |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121178 A1 | 5/2011 | Strandemar |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2011/0134303 A1 | 6/2011 | Jung et al. |
| 2011/0234864 A1 | 9/2011 | Inokuma |
| 2011/0279673 A1 | 11/2011 | Teich et al. |
| 2012/0007987 A1 | 1/2012 | Gaber |
| 2012/0083314 A1 | 4/2012 | Ng et al. |
| 2012/0140881 A1 | 6/2012 | Yoshimatsu et al. |
| 2012/0169866 A1 | 7/2012 | Schmidt et al. |
| 2012/0184252 A1 | 7/2012 | Hirsch |
| 2012/0211648 A1 | 8/2012 | Linsacum et al. |
| 2012/0213411 A1 | 8/2012 | Nozaki |
| 2012/0229650 A1 | 9/2012 | Matthews |
| 2012/0262584 A1 | 10/2012 | Strandemar |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0312976 A1 | 12/2012 | Boulanger et al. |
| 2012/0320086 A1 | 12/2012 | Kasama et al. |
| 2013/0204570 A1 | 8/2013 | Mendelson et al. |
| 2013/0320220 A1 | 12/2013 | Donowsky |

FOREIGN PATENT DOCUMENTS

| | | |
|---|---|---|
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 0398725 | 11/1990 |
| EP | 0837600 | 4/1998 |
| EP | 1253779 | 10/2002 |
| EP | 1939809 | 7/2008 |
| EP | 1983485 | 10/2008 |
| EP | 2477391 | 7/2012 |
| EP | 2533226 | 12/2012 |
| JP | 1997275518 | 4/1999 |
| JP | 2004004465 | 1/2004 |
| JP | 2004048571 | 2/2004 |
| JP | 2006098098 | 4/2006 |
| JP | 2006105655 | 4/2006 |
| JP | 2007006475 | 1/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |

(56) References Cited

FOREIGN PATENT DOCUMENTS

| | | |
|---|---|---|
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 20060054877 | 5/2006 |
| KR | 20060071220 | 6/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |

(56) References Cited

FOREIGN PATENT DOCUMENTS

| | | |
|---|---|---|
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 20100129533 | 12/2010 |
| KR | 20110006437 | 1/2011 |
| KR | 20110011264 | 2/2011 |
| KR | 2011024290 | 3/2011 |
| KR | 20110019994 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 97/22860 | 6/1997 |
| WO | WO 02/067575 | 8/2002 |
| WO | WO 03/093963 | 11/2003 |
| WO | WO 2004/027459 | 4/2004 |
| WO | WO 2005/002228 | 1/2005 |
| WO | WO 2005/015143 | 2/2005 |
| WO | WO 2005/088846 | 9/2005 |
| WO | WO 2006/096211 | 9/2006 |
| WO | WO 2006/112866 | 10/2006 |
| WO | WO 2007/006242 | 1/2007 |
| WO | WO 2007/041484 | 4/2007 |
| WO | WO 2008/087373 | 7/2008 |
| WO | WO 2008/094102 | 8/2008 |
| WO | WO 2009/122114 | 10/2009 |
| WO | WO 2010/005152 | 1/2010 |
| WO | WO 2010/033142 | 3/2010 |
| WO | WO 2011/131758 | 10/2011 |
| WO | WO 2012/027739 | 3/2012 |
| WO | WO 2012/170946 | 12/2012 |
| WO | WO 2012/170949 | 12/2012 |
| WO | WO 2012/170953 | 12/2012 |
| WO | WO 2012/170954 | 12/2012 |

OTHER PUBLICATIONS

Branchitta et al., "Dynamic range compression and contrast enhancement in IR Imaging systems", Proc. of SPIE vol. 6737, Dec. 31, 2007, pp. 1-11.

FLIR, "FLIR P640 Infrared Camera", Jan. 23, 2010, pp. 1-2 http://www.flir.com/uploadedFiles/Thermography_APAC/Products/Product_Literature/AU_P640_Datasheet_APAD.pdf.

\* cited by examiner

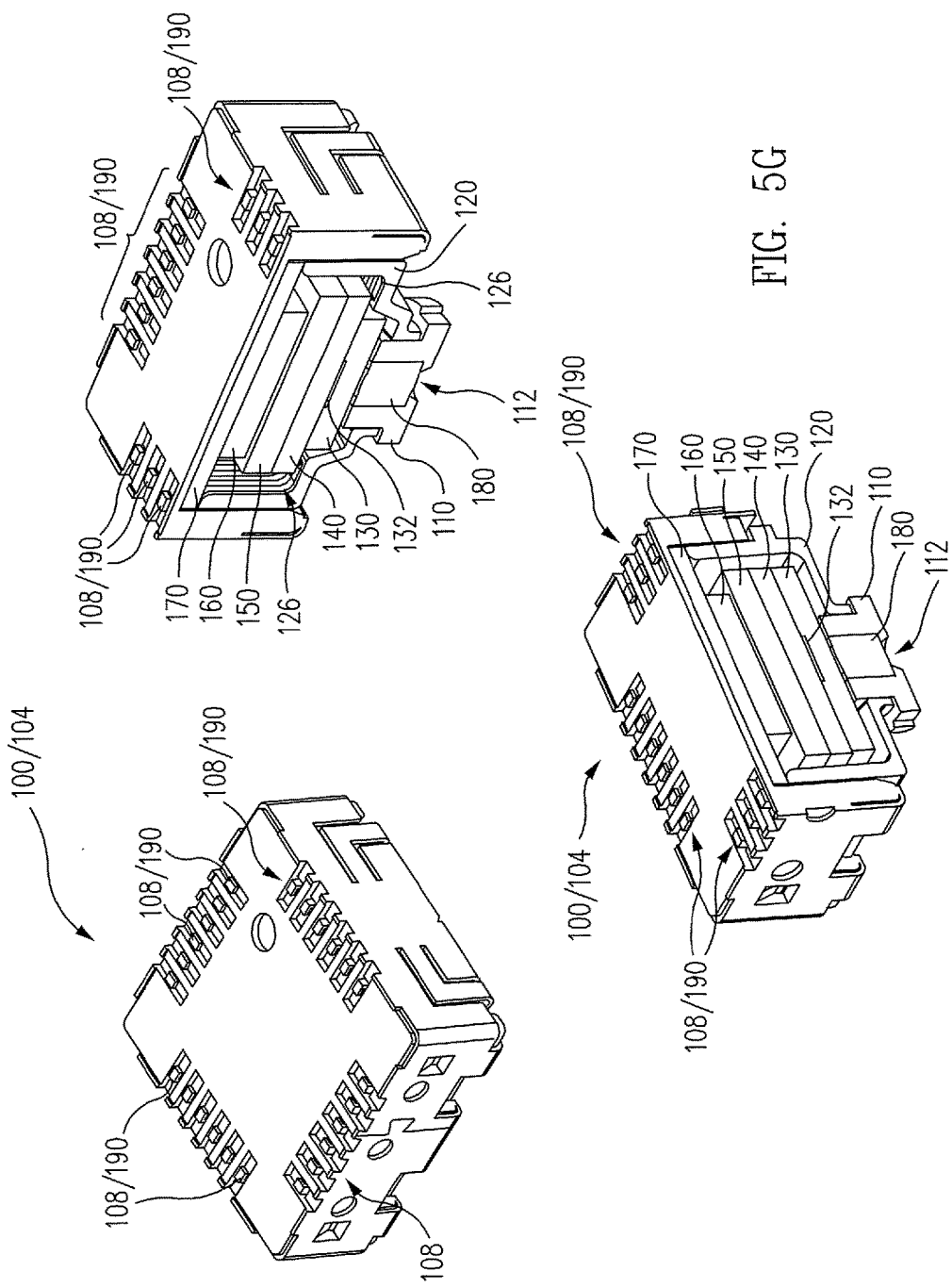

INFRARED CAMERA SYSTEM ARCHITECTURES

CROSS-REFERENCE TO RELATED APPLICATIONS

This application is a continuation of U.S. patent application Ser. No. 14/101,258 filed Dec. 9, 2013 and entitled "INFRARED CAMERA SYSTEM ARCHITECTURES" which is hereby incorporated by reference in its entirety.

U.S. patent application Ser. No. 14/101,258 is a continuation of International Patent Application No. PCT/US2012/041739 filed Jun. 8, 2012 which claims priority to U.S. Provisional Patent Application No. 61/495,873 filed Jun. 10, 2011 and entitled "INFRARED CAMERA PACKAGING SYSTEMS AND METHODS" which are both hereby incorporated by reference in their entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

TECHNICAL FIELD

One or more embodiments of the invention relate generally to imaging devices and more particularly, for example, to infrared imaging devices.

BACKGROUND

Existing infrared imaging devices, such as infrared cameras, are often implemented as large systems that may be mounted on fixed or mobile platforms. Other infrared cameras may be configured for handheld use, but are generally rather large, dedicated devices.

In this regard, conventional infrared cameras are generally not available in small form factors suitable for use in other devices. Such factors generally limit the ability to use infrared imaging devices in conjunction with other portable devices and in environments where large camera systems are impractical. Accordingly, there is a need for an improved infrared imaging device that exhibits a small form factor and may be used with other portable devices In addition, existing infrared imaging devices are often implemented for use with various image processing devices. The image processing devices are often implemented with dedicated hardware.

Unfortunately, such dedicated hardware is often limited in its flexibility. For example, circuitry that may be optimized to perform certain image processing tasks may not be easily adapted for use to perform additional image processing tasks, especially when the image processing devices are to be located within the infrared camera itself and therefore subject to limited space and power specifications.

Accordingly, there is a need for an improved approach to image processing devices for infrared imaging devices, which for example may be more appropriate for small form factor applications.

SUMMARY

Various techniques are disclosed for providing an infrared imaging module that exhibits a small form factor and may be used with one or more portable devices. For example, an infrared imaging module may be provided using wafer level packaging techniques along with other novel infrared camera packaging techniques. Such an infrared imaging module may be implemented with a housing that includes electrical connections that may be used to electrically connect various components of the infrared imaging module.

In one embodiment, an infrared imaging module may be configured to be inserted in a socket of a host device. Such an embodiment may permit the infrared imaging module to be implemented in a variety of different host devices to provide infrared image detection capabilities to such host devices. Moreover, by using such a socket-based implementation, the infrared imaging module may be added to the host device at a time separate from the manufacture of the infrared imaging module or after the manufacture of the host device.

In one embodiment, a device includes an infrared imaging module comprising a housing configured to engage with a socket; an infrared sensor assembly within the housing and adapted to capture infrared image data; a processing module within the housing and adapted to process the image data; and a lens coupled to and at least partially within the housing and configured to pass infrared energy through to the infrared sensor assembly.

In another embodiment, a method includes passing infrared energy through a lens coupled to and at least partially within a housing of an infrared imaging module of a device, wherein the housing is configured to engage with a socket; capturing infrared image data from the passed infrared energy at an infrared sensor assembly within the housing; and providing electrical signals from the infrared sensor assembly to a processing module within the housing.

In addition, various techniques are disclosed for providing system architectures for processing modules of infrared imaging modules. In various embodiments, a processing modules may perform digital infrared image processing of infrared images captured by an infrared sensor of an infrared imaging module. In one embodiment, an infrared sensor may be implemented with a small array size and appropriate read out circuitry that permits the infrared sensor to capture and provide infrared images at a high frame rate. The processing module may be implemented to process the captured infrared images and provide processed images to a host device at a lower frame rate such that each processed image is based on the processing of a plurality of the captured infrared images.

In one embodiment, a processing module of an infrared imaging module includes a first interface adapted to receive captured infrared images from an infrared image sensor of the infrared imaging module; a processor adapted to perform digital infrared image processing on the captured infrared images to provide processed infrared images; and a second interface adapted to pass the processed infrared images to a host device.

In another embodiment, a method of operating a processing module of an infrared imaging module includes receiving captured infrared images from an infrared image sensor of the infrared imaging module over a first interface of the processing module; performing digital infrared image processing on the captured infrared images to provide processed infrared images; and passing the processed infrared images to a host device over a second interface.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 5F-P illustrate additional views of infrared imaging modules implemented with several form factors in accordance with various embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
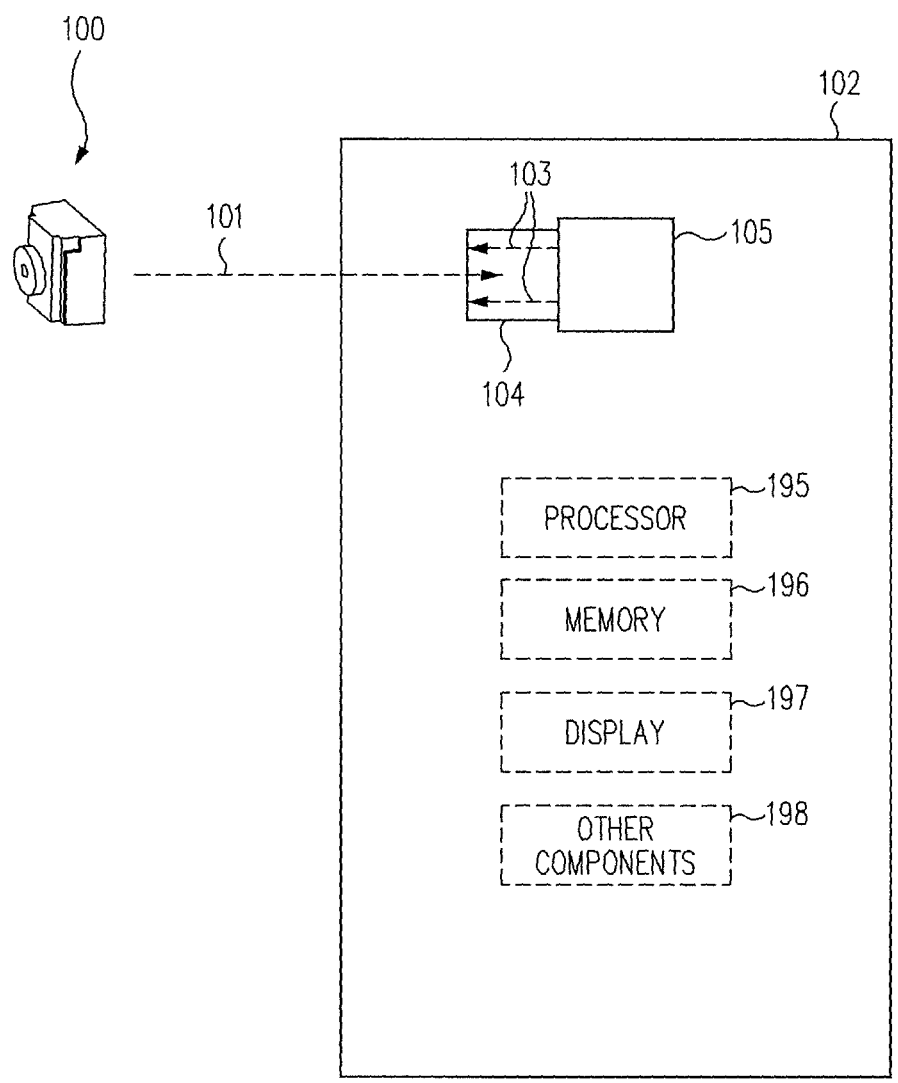
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques along with other novel infrared camera packaging techniques as discussed herein.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated without requiring significant additional measures to compensate for such self heating.

Figure 2:
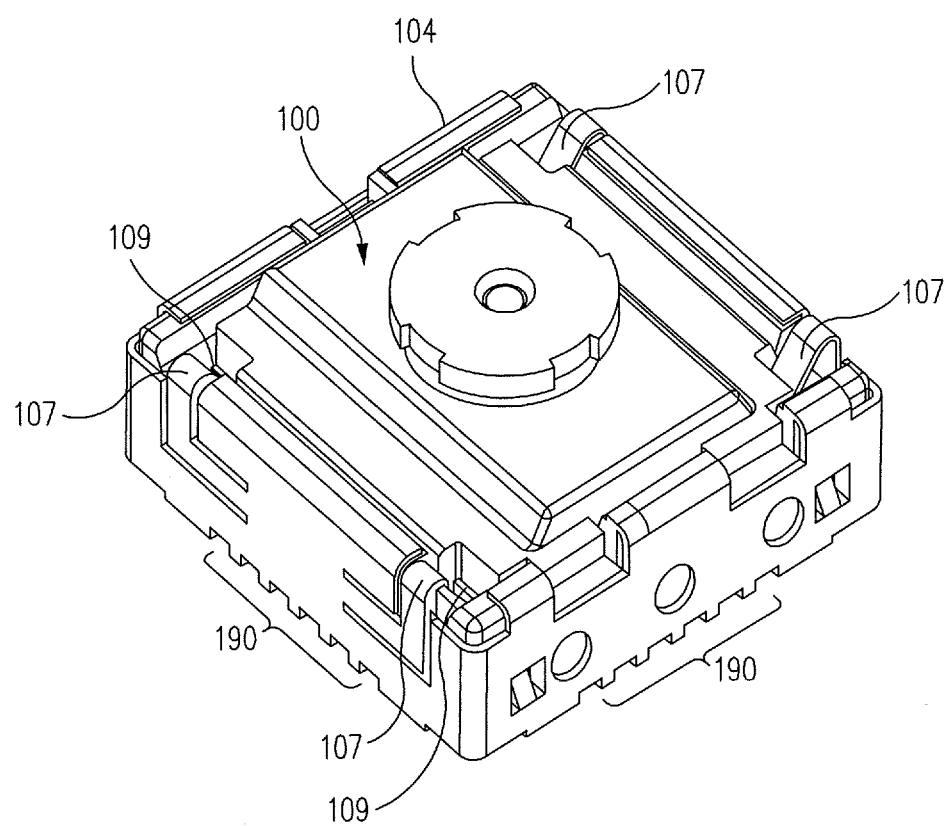
FIG. 2 illustrates an assembled infrared imaging module in accordance with an embodiment of the disclosure.

As shown in FIG. 1, host device 102 may include a socket 104, a shutter 105, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., a visible light camera or other components).

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
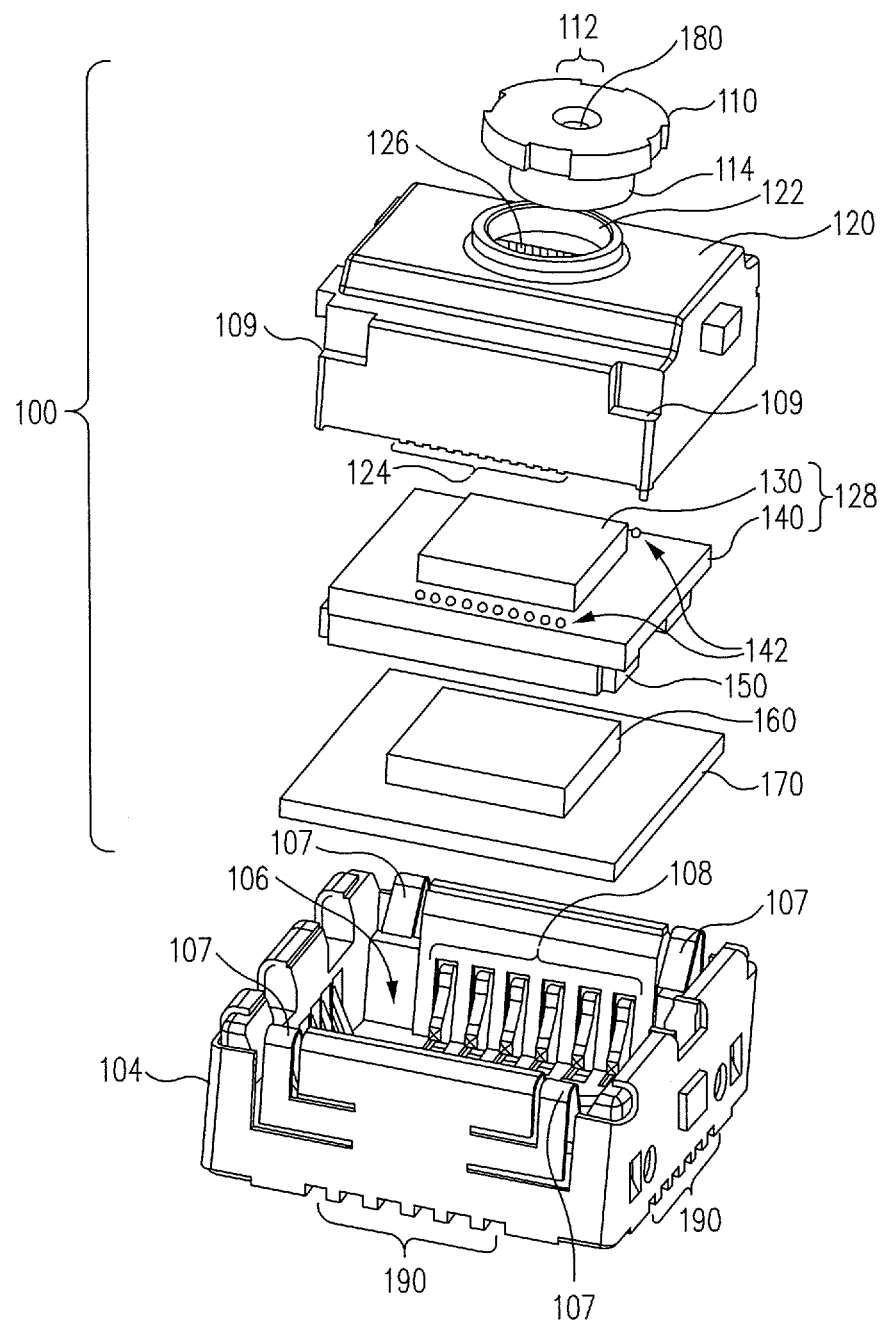
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 which is partially visible in FIG. 3 through an aperture 112 in lens barrel 110. Lens barrel 100 may include a substantially cylindrical extension 114 which may be used to interface lens barrel 100 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130 (e.g., shown in FIGS. 5A-K, 5M-P, and 8). For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Figure 5A:
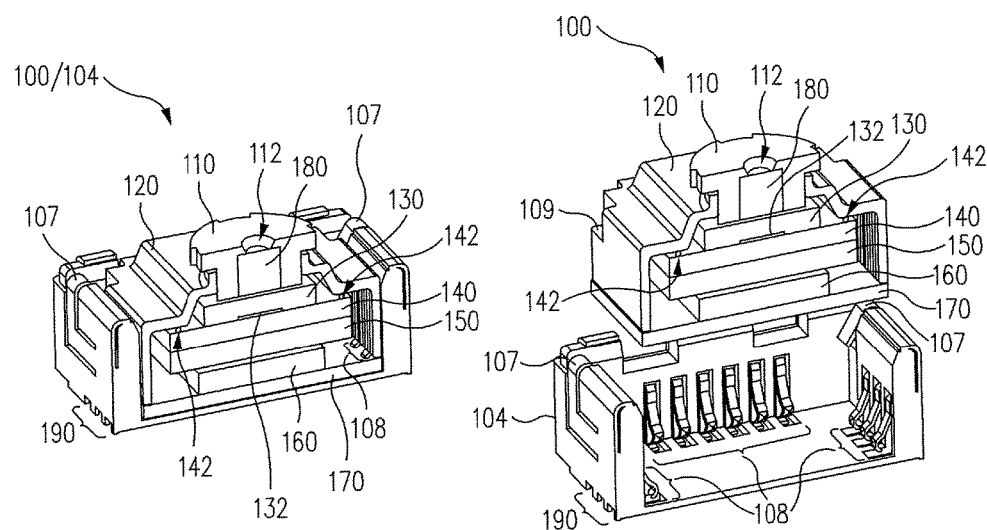
FIGS. 5A-E illustrate cross-sectional views of infrared imaging modules implemented with several form factors in accordance with various embodiments of the disclosure.
Figure 5B:
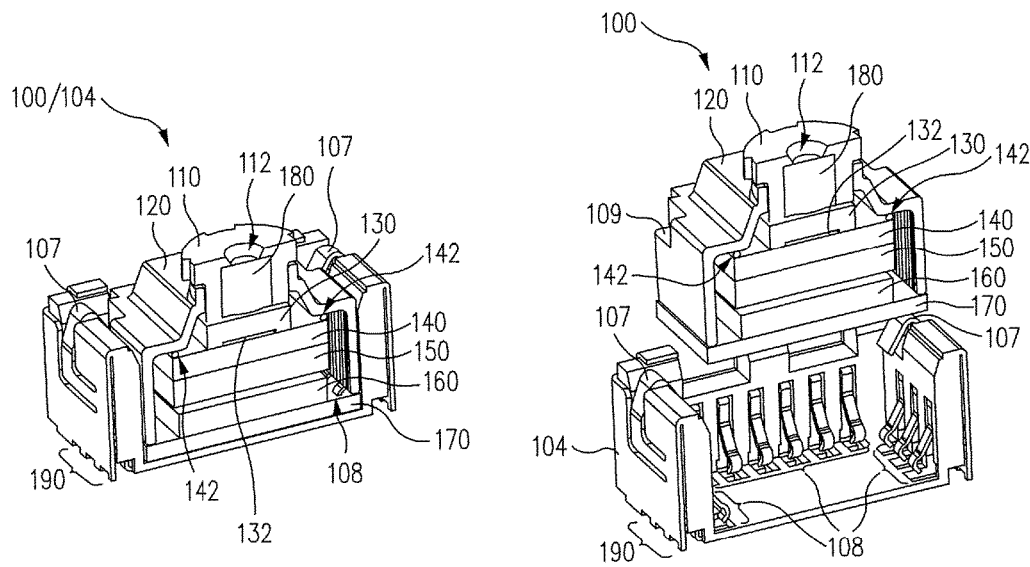
Figure 5C:
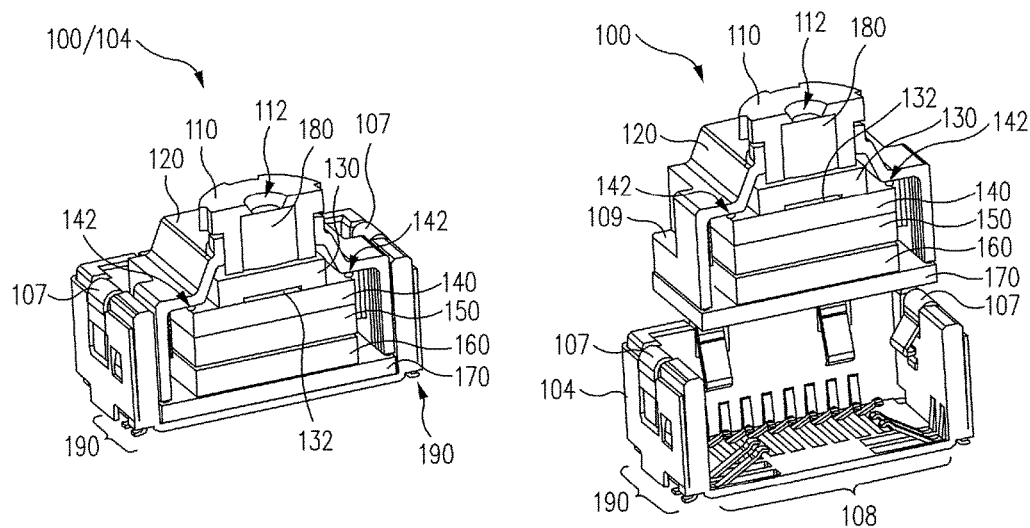

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 5B, and 5C. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 as shown in FIGS. 5A-C and FIGS. 5F-I). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. For example, as shown in FIGS. 2-3, 5A-F, 5H, 5J, 5L-M, and 5O-P, socket 104 may include engagement members 107 that may engage surfaces 109 of housing 120 when infrared imaging module 100 is inserted into a cavity 106 of socket 104. Other types of engagement members may be used in other embodiments.

Figure 5D:
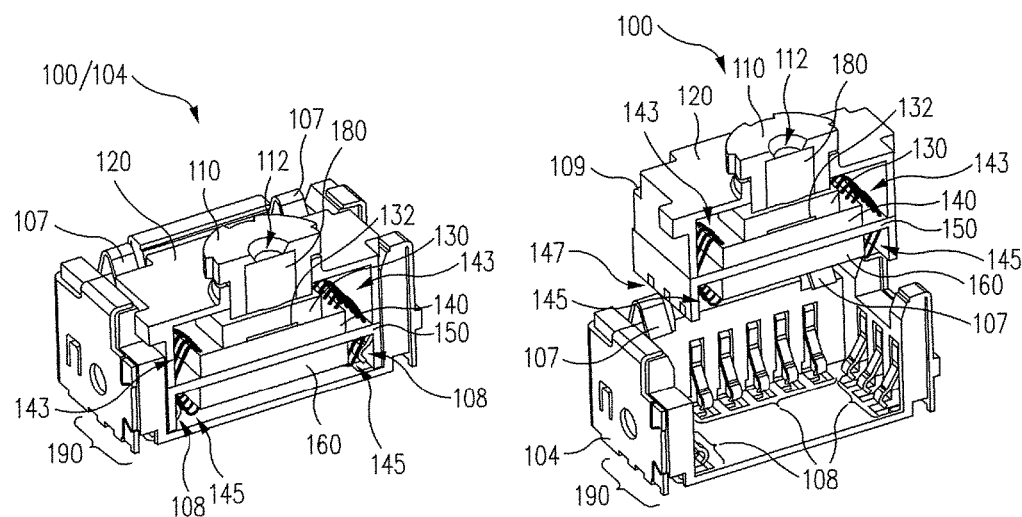
Figure 5E:
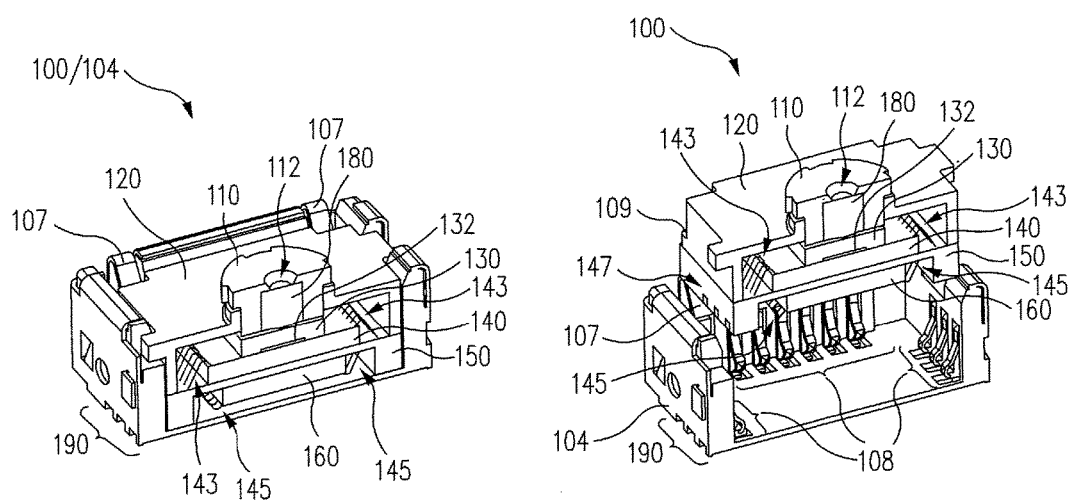
Figure 5F:
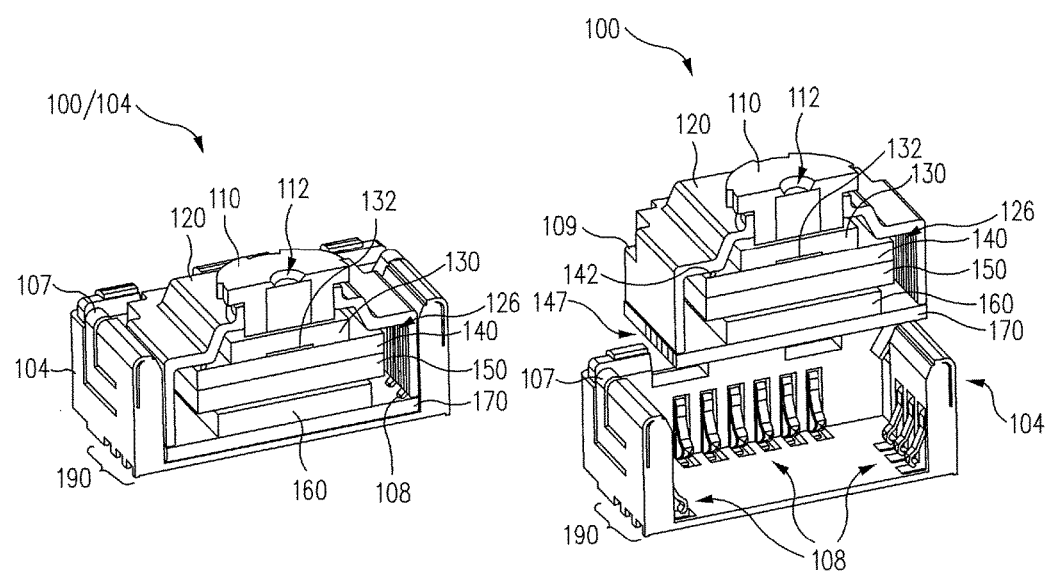

Infrared imaging module 100 may be electrically connected with socket 104 through appropriate electrical connections (e.g., contacts, pins, wires, or any other appropriate connections). For example, as shown in FIGS. 3 and 5A-P, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190 as shown in FIGS. 2-3 and 5A-P. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, in FIGS. 5A-C, 5F-I, and 5L (further described herein), infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Figure 4:
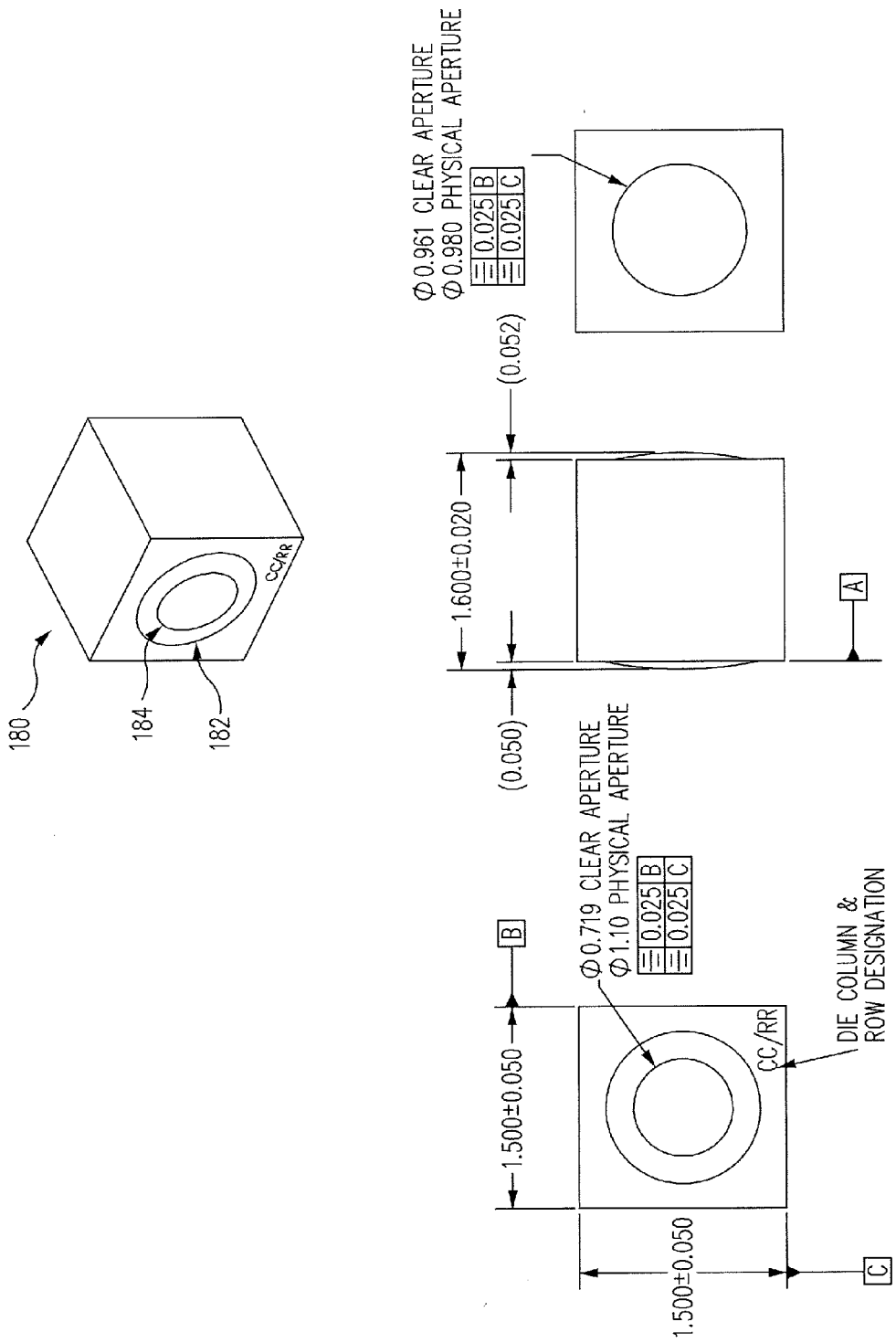
FIG. 4 illustrates an example implementation of an optical element that may be implemented in an infrared imaging module in accordance with an embodiment of the disclosure.

FIG. 4 illustrates an example implementation of optical element 180 that may be implemented in infrared imaging module 100 in accordance with an embodiment of the disclosure. In one embodiment, optical element 180 may be implemented as a silicon etched wafer level single element optic in accordance with various dimensions shown in FIG. 4.

As also shown in FIG. 4, optical element 180 may be implemented substantially as a cube, but with two slightly convex faces on faces providing apertures. For example, optical element 180 may include a physical aperture 182 and a smaller clear aperture 184. Optical element 180 allows through the desired infrared wavelengths to infrared sensor assembly 128.

In one embodiment, optical element 180 may be a single etched wafer level optical element made of silicon with the following specifications: image plane of 0.54 mm by 0.54 mm (e.g., when implemented for an infrared sensor assembly 128 having a 32 by 32 array of infrared sensors 132 with 17 μm pixel pitch); horizontal field of view (FoV) of approximately 55.7 degrees; F/# approximately equal to 0.91; modulated transfer function (MTF) of approximately 0.46 at 29 cy/mm; an anti-reflective coating with less than approximately two percent loss per surface; and focused at infinity.

In some embodiments, optical element 180 may be integrated as part of a wafer level package that includes infrared sensor assembly 128. For example, optical element 180 may be implemented as part of cap 130, stacked on various components of infrared sensor assembly 128 (e.g., with appropriate spacers provided therebetween), or otherwise integrated with various components of infrared sensor assembly 128.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a non-uniformity correction (NUC) process or other calibration processes) for infrared imaging module 100 as would be understood by one skilled in the art.

In various embodiments, shutter 105 may be made from various materials such as, for example, polymers, glass, or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art. Alternatively, in another embodiment, a shutter (e.g., shutter 105 or other type of external or internal shutter) need not be provided, but rather a NUC process or other type of calibration may be performed using shutterless techniques.

FIGS. 5A-E illustrate cross-sectional views of infrared imaging modules 100 implemented with several form factors in accordance with various embodiments of the disclosure. In particular, each of FIGS. 5A-E shows a cross-sectional view of an infrared imaging module 100 while installed in a corresponding socket 104, and another cross-sectional view of the same infrared imaging module 100 but separated from its corresponding socket 104.

It will be appreciated that FIGS. 5A-E show a variety of physical implementations of various components identified in FIGS. 1-4. For example, FIG. 5A shows a physical implementation of infrared imaging module 100 and socket 104 corresponding to the embodiments illustrated in FIGS. 2-3, while FIGS. 5B-E show other examples of physical implementations.

It will also be appreciated that, in FIGS. 5A-C, electrical connections 126 may be provided in housing 120 as discussed to infrared sensor assembly 128 and circuit board 170. In contrast, in FIGS. 5D-E, wire bonds 143 and 145 may be used to connect infrared sensor assembly 128 to processing module 160. In one embodiment, wire bonds 143 and 145 may pass through base 150. In another embodiment, wire bonds 143 and 145 may connect to circuitry in base 150 without passing through base 150. In yet another embodiment, wire bonds 143 and 145 may connect to electrical connections 147 to provide electrical connections between various portions of infrared imaging module 100 to socket 104 and/or host device 102.

In some embodiments, sockets 104 shown in FIGS. 5A-E may be implemented as mobile telephone camera sockets available from, for example, Molex® Incorporated of Lisle, Ill. in accordance with various part numbers identified in Table 1 below. Table 1 further identifies various example aspects of sockets 104 shown in FIGS. 5A-E.

Figure 5H:
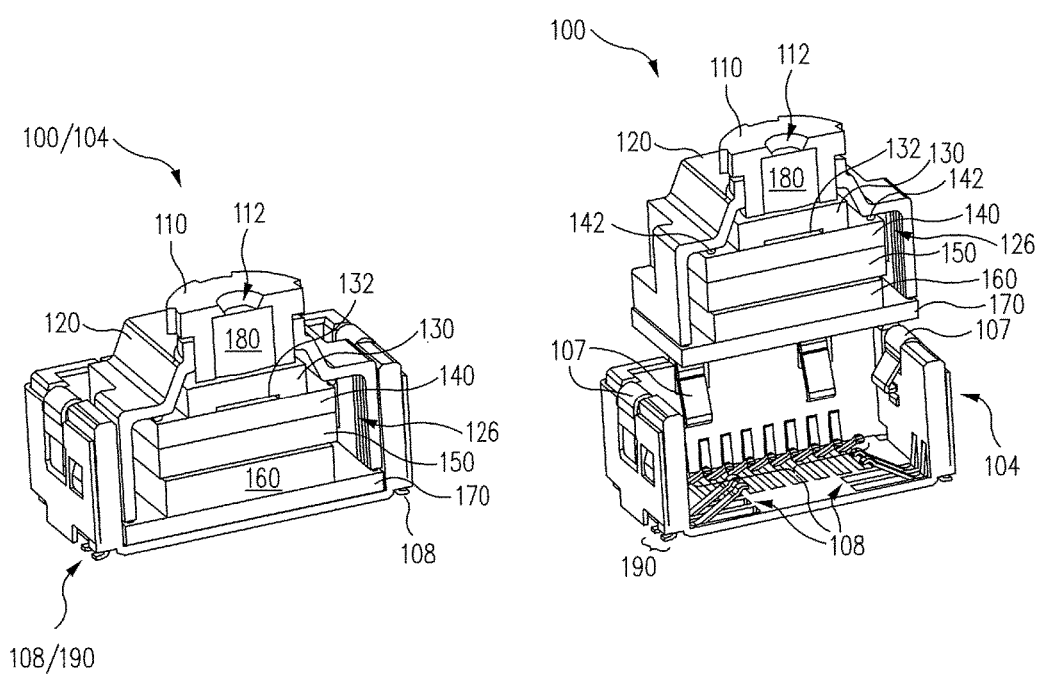

FIG. 5H illustrates an embodiment of infrared imaging module 100 similar to FIG. 5C. In FIG. 5H, electrical connections 126 are shown on an inside surface of housing 120. In addition, electrical connections 108 are depicted in a contrasting color for further clarity.

Figure 5I:
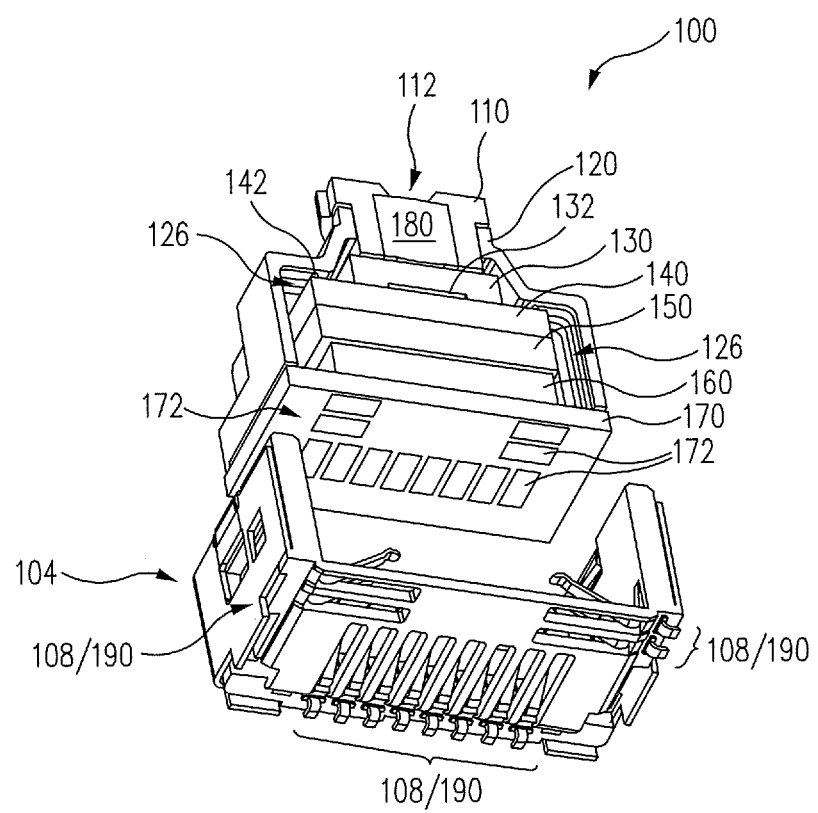

FIG. 5I illustrates an embodiment of infrared imaging module 100 that provides another view of the embodiment shown in FIG. 5H. In FIG. 5I, contacts 172 are shown on a bottom surface of circuit board 170 which may contact electrical connections 108 when infrared imaging module 100 is inserted into socket 104. Accordingly, it will be appreciated that the various components of infrared imaging module 100 may be electrically connected to host device 102 through contacts 172 and electrical connections 108.

Figure 5J:
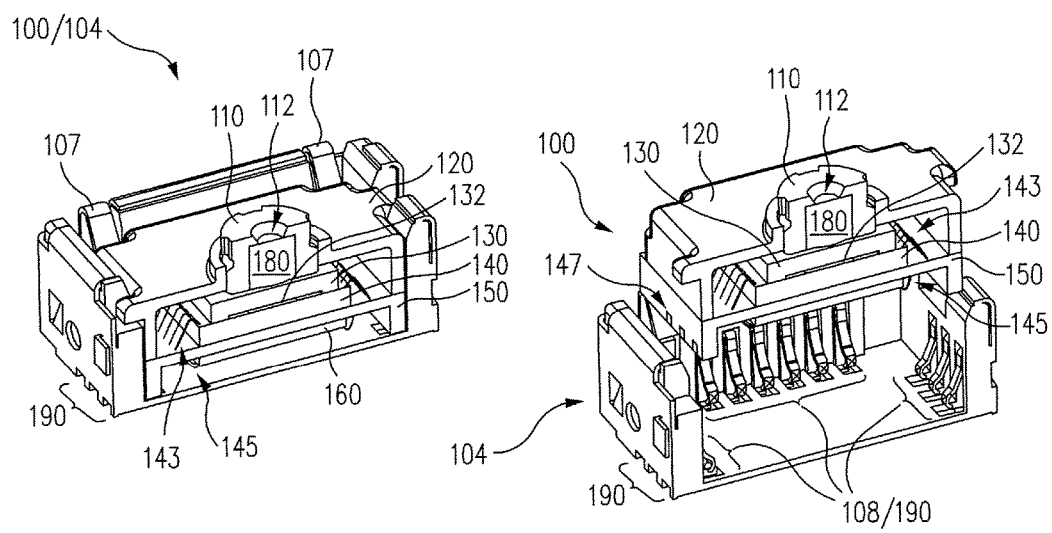

FIG. 5J illustrates an embodiment of infrared imaging module 100 similar to FIG. 5D and with socket 104 similar to that illustrated in FIG. 5E. In FIG. 5J, electrical connections 108 are depicted in a contrasting color for further clarity. Also, electrical connections 147 are shown on side surfaces of circuit board 170 which may connect to electrical connections 108.

Figure 5K:
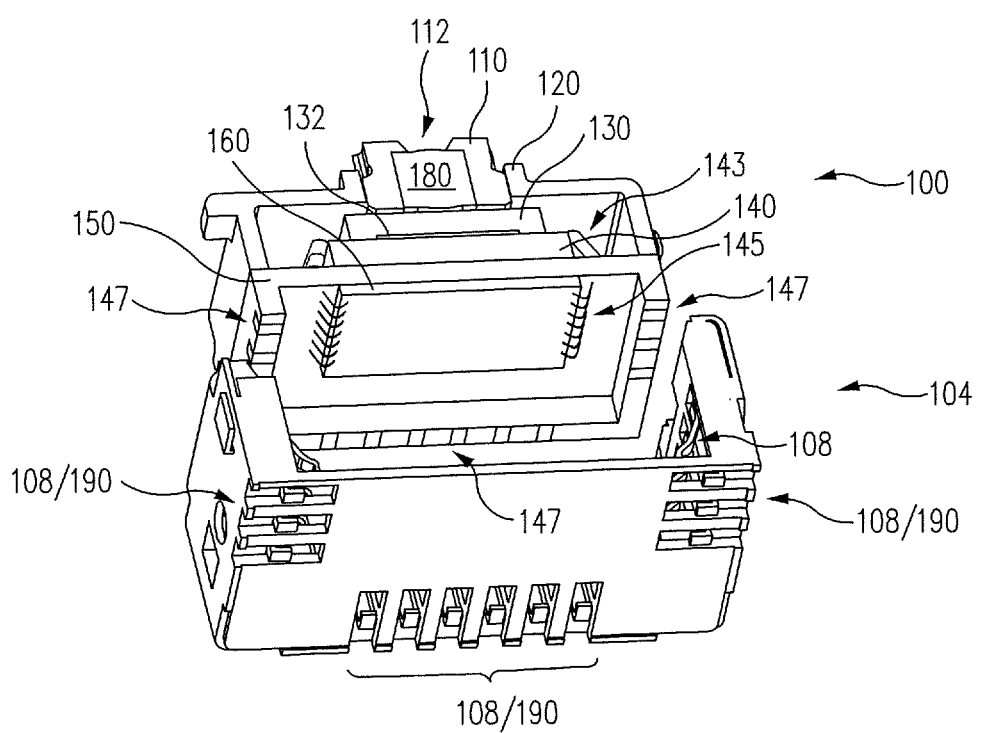

FIG. 5K illustrates an embodiment of infrared imaging module 100 that provides another view of the embodiment shown in FIG. 5J. In FIG. 5K, electrical connections 147 are further shown on bottom surfaces of circuit board 170 which may connect with appropriate electrical connections 108.

Figure 5L:
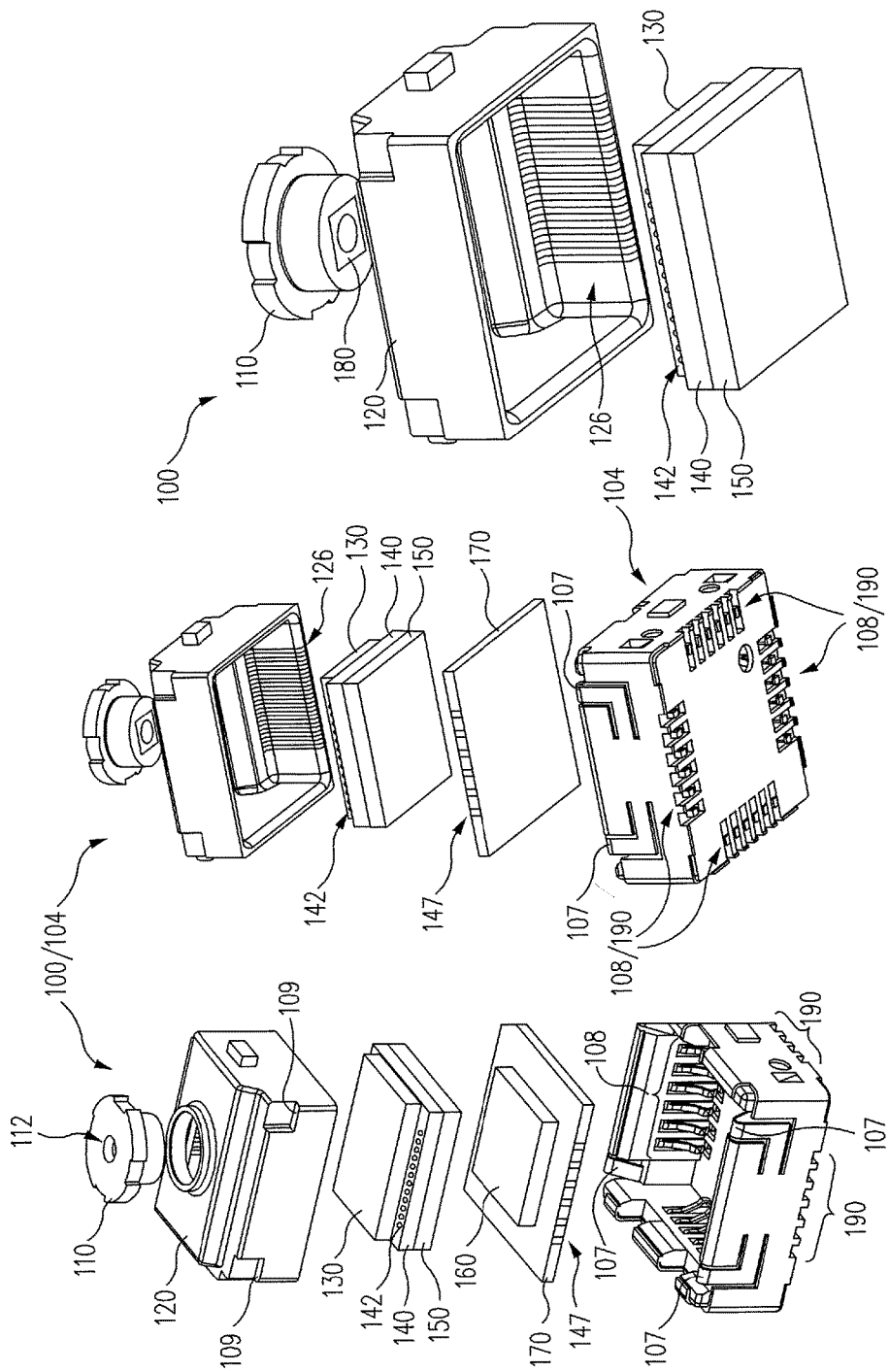

FIG. 5L illustrates several embodiments of infrared imaging module 100 in exploded views. For example, in FIG. 5L, electrical connections 126 are shown on an inside surface of housing 120. Also, electrical connections 147 are shown on side surfaces of circuit board 170 which may connect to electrical connections 108. In addition, electrical connections 108 are depicted in a contrasting color for further clarity inside socket and also on a bottom surface of socket

TABLE 1

|  | Internal Socket Size L × W (mm) | Socket Type | Part Number | Frame | Board | Overall Package Dimensions L × W × H (mm) | Camera Sub Assembly Dimensions L × W × H (mm) | Sensor Size (mm) | Window Size (mm) | Frame Thickness (mm) |
|---|---|---|---|---|---|---|---|---|---|---|
| FIG. 5A | 8.50 × 8.50 | Side Contact | SD-47337-001 | LDS-MID | PCB | 10.60 × 10.60 × 5.90 | 8.50 × 8.50 × 5.65 | 6.5 × 7.5 | 4.0 × 4.0 | 0.300 |
| FIG. 5B | 6.50 × 6.50 | Side Contact | SD-47586-001 | LDS-MID | PCB | 8.60 × 8.60 × 5.90 | 6.50 × 6.50 × 5.65 | 5.0 × 5.5 | 3.0 × 3.0 | 0.100-0.250 |
| FIG. 5C | 6.50 × 6.50 | Bottom Contact | SD-78499-001 | LDS-MID | PCB | 8.00 × 8.00 × 5.80 | 6.50 × 6.50 × 5.55 | 4.8 × 5.7 | 3.0 × 3.0 | 0.100-0.250 |
| FIG. 5D | 6.50 × 6.50 | Side Contact | SD-47586-001 | LCP | Ceramic | 8.60 × 8.60 × 5.00 | 6.50 × 6.50 × 4.75 | 4.4 × 5.3 | 3.0 × 3.0 | 0.250 |
| FIG. 5E | 8.50 × 8.50 | Side Contact | SD-47337-001 | LCP | Ceramic | 10.60 × 10.60 × 5.00 | 8.50 × 8.50 × 4.75 | 5.5 × 5.5 | 4.0 × 4.0 | 0.400 |

FIGS. 5F-P illustrate additional views of infrared imaging module 100 implemented with several form factors in accordance with various embodiments of the disclosure. For example, FIG. 5F illustrates an embodiment of infrared imaging module 100 similar to FIG. 5A. In FIG. 5F, electrical connections 126 are shown on an inside surface of housing 120. In addition, electrical connections 108 are depicted in a contrasting color for further clarity. Also, electrical connections 147 are shown on side surfaces of circuit board 170 which may connect to electrical connections 108.

FIG. 5G illustrates an embodiment of infrared imaging module 100 similar to FIG. 5A with electrical connections 108 depicted in a contrasting color for further clarity on a bottom surface of socket 104 which may be used to interface with appropriate connections of host device 102.

104 which may be used to interface with infrared imaging module 100 and host device 102.

Figure 5M:
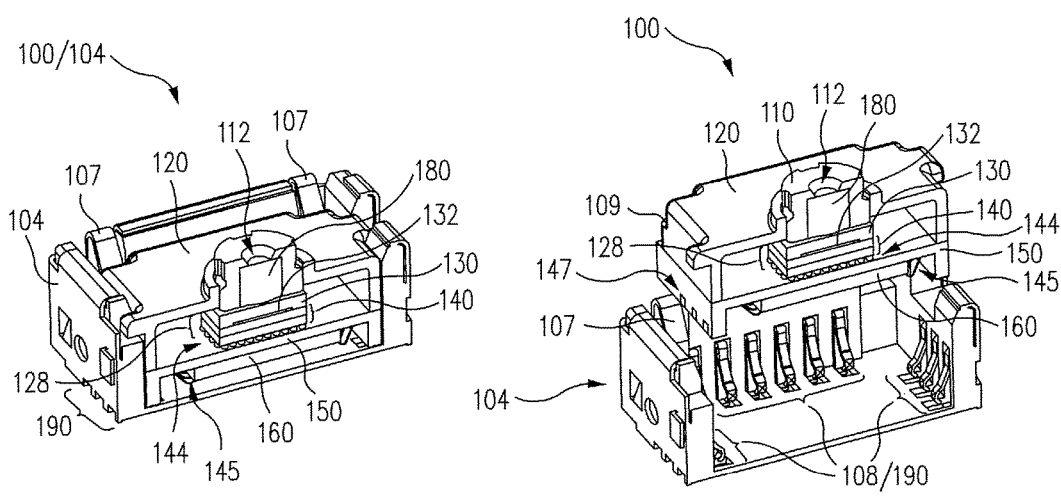
Figure 5N:
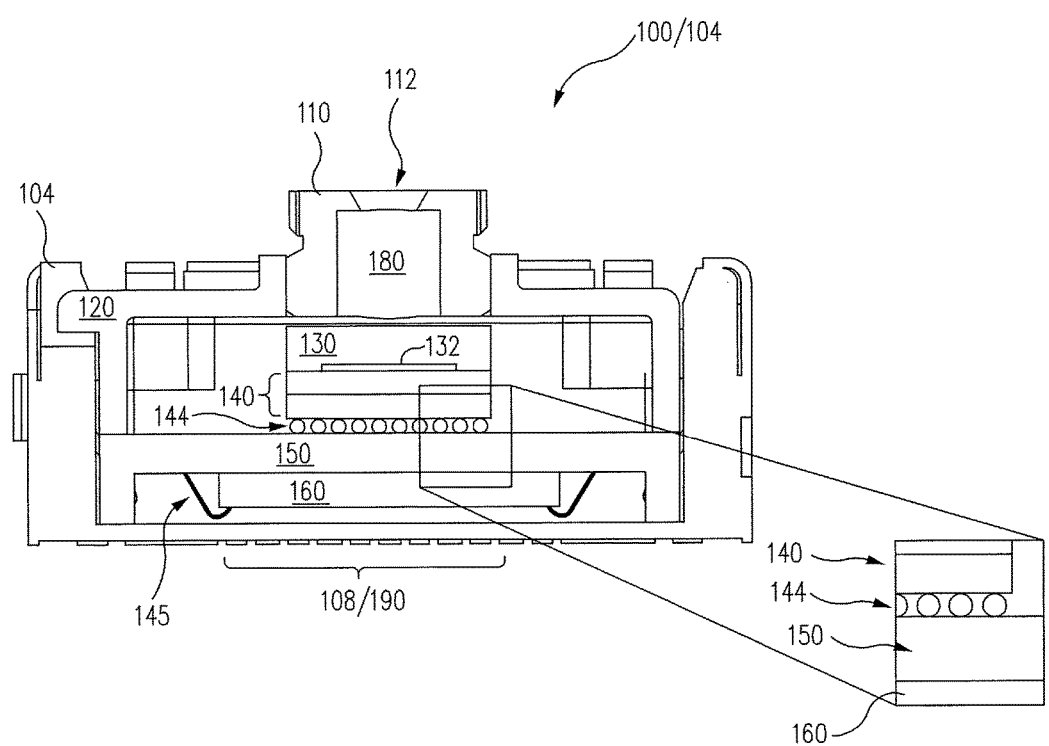
Figure 50:
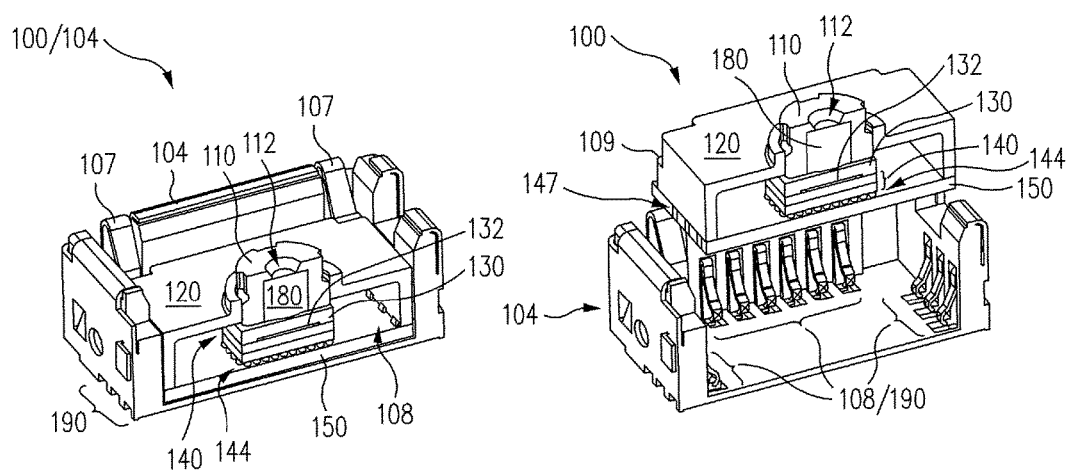
Figure 5P:
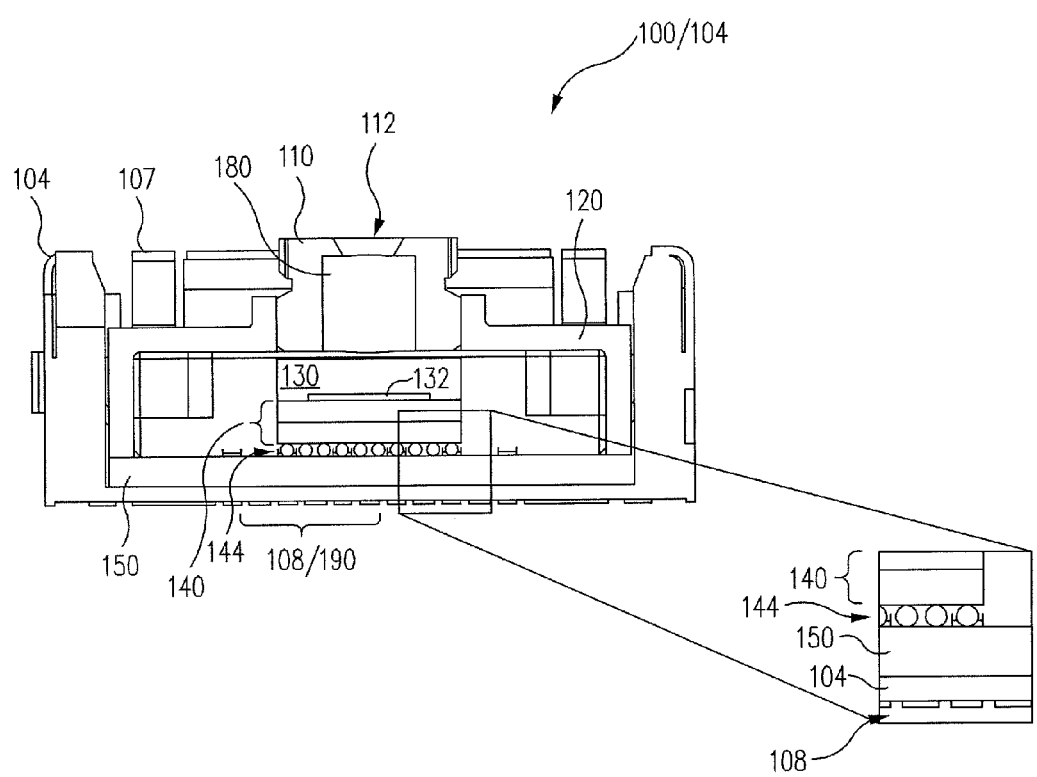

FIG. 5M illustrates an embodiment of infrared imaging module 100 implemented with various components of infrared sensor assembly 128 (e.g., cap 130 and substrate 140) having a substantially uniform width. In one embodiment, such an implementation may permit the various components of infrared sensor assembly 128 to be singulated together during manufacture. In FIG. 5M, substrate 140 may be implemented with a split (e.g., multi-layer) implementation with the ROIC provided on one or both layers and connected to other circuitry of substrate 140 through the layers (e.g., through appropriate silicon vias or other connections). As also shown in FIG. 5M, substrate 140 may be connected to base 150 through solder balls 144 (e.g., to implement flip chip mounting), and processing module 160 may be connected to base 150 through wire bonds 145. FIG. 5N illustrates an embodiment of infrared imaging module 100 that provides another view of the embodiment shown in FIG. 5M.

FIG. 5O illustrates an embodiment of infrared imaging module 100 with infrared sensor assembly 128 implemented in a similar fashion as FIGS. 5M-N. In FIG. 5O, processing module 160 may be integrated as part of substrate 140.

FIG. 5P illustrates an embodiment of infrared imaging module 100 that provides another view of the embodiment shown in FIG. 5O. FIG. 5P further illustrates electrical connections 108 on a bottom surface of socket 104.

Additional implementations of infrared imaging modules 100 are also contemplated. For example, FIGS. 6-8 illustrate infrared imaging modules 100 implemented with several topologies in accordance with various embodiments of the disclosure.

Figure 6:
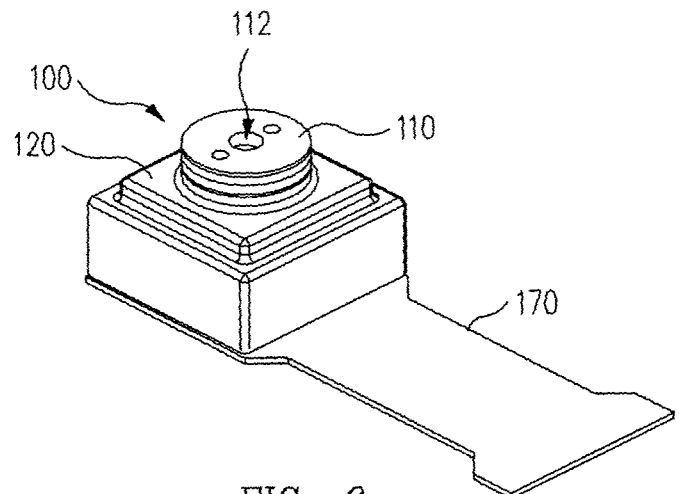
FIGS. 6-8 illustrate infrared imaging modules implemented with several topologies in accordance with various embodiments of the disclosure.

For example, FIG. 6 illustrates infrared imaging module 100 after encapsulation. FIG. 7 illustrates infrared imaging module 100 with processing module 160 mounted on circuit board 170 and external to housing 120 to provide a lower overall profile for imaging module 100.

Figure 7:
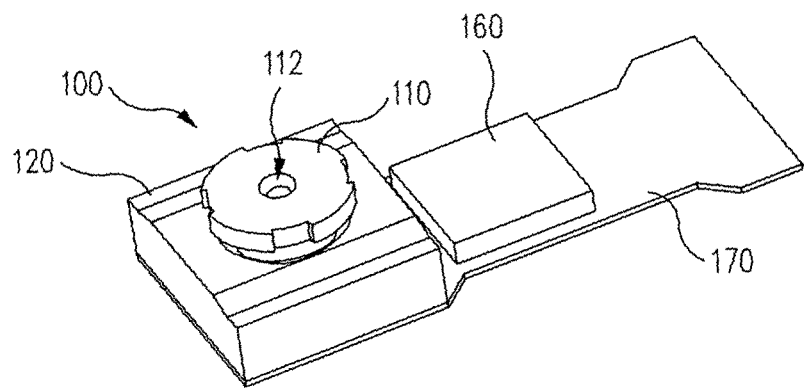
Figure 8:
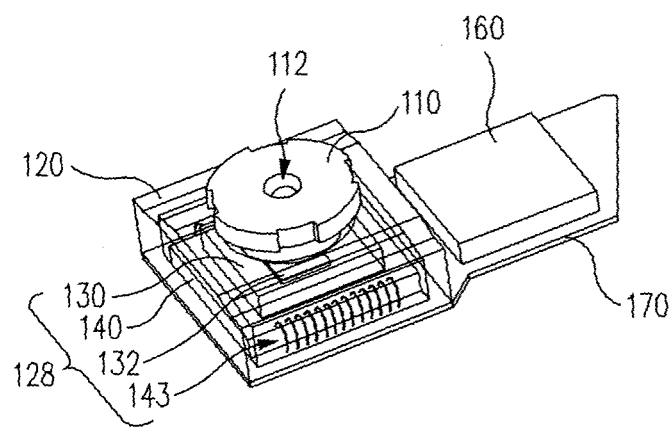

FIG. 8 illustrates infrared imaging module 100 of FIG. 7 with housing 120 shown transparent for purposes of illustrating examples of cap 130, an array of infrared sensors 132, and wire bonds 143. As shown in FIG. 8, various components of infrared sensor assembly 128 may be connected to circuit board 170 through wire bonds 143.

Figure 9:
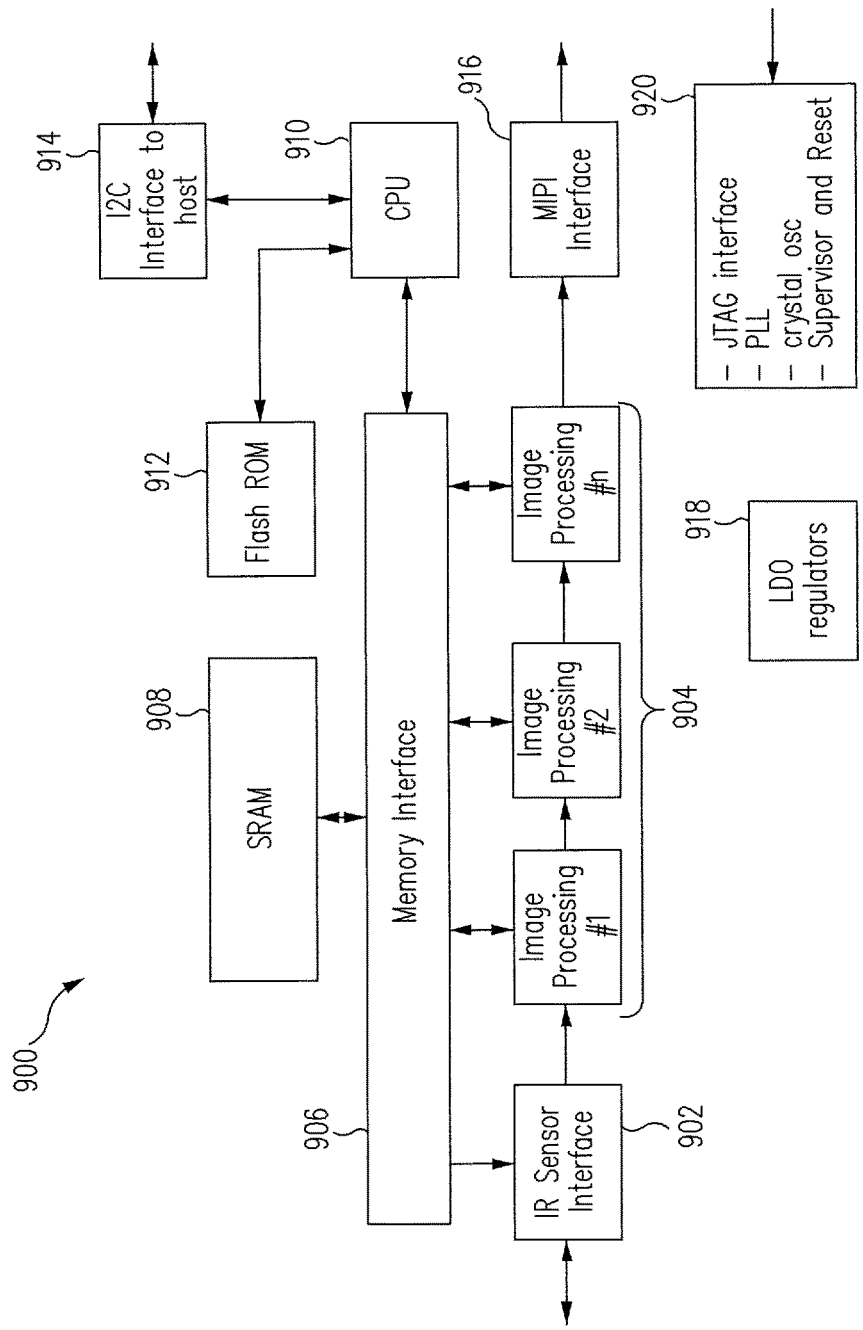
FIG. 9 illustrates a block diagram of a system architecture used to implement a processing module of an infrared imaging module in accordance with an embodiment of the disclosure.

FIG. 9 illustrates a block diagram of a system architecture 900 used to implement processing module 160 for infrared imaging module 100 in accordance with an embodiment of the disclosure. System architecture 900 includes, for example, an infrared sensor interface 902, image processing blocks 904 (e.g., denoted #1 through #n), a memory interface 906, a volatile memory 908 (e.g., a static read only memory (SRAM) or another type of volatile memory), a central processing unit (CPU) 910, a non-volatile memory 912 (e.g., a flash read only memory (ROM) or another type of non-volatile memory), an I2C interface 914, a MIPI interface 916, LDO regulators 918, and various other components 920 (e.g., a 2.4 volt interface, a 2.5 volt interface, a 2.8 volt interface, a JTAG interface, a phase locked loop (PLL), a crystal oscillator, supervisor and reset interfaces, and other interfaces or components as may be appropriate in various embodiments).

Infrared sensor interface 902 may support communications between system architecture 900 and infrared sensor assembly 128. For example, infrared sensor interface 902 may send and receive communications to and from infrared sensor assembly 128 through electrical connections 126 in housing 120 or through wire bonds 143 and 145.

As shown in FIG. 9, infrared sensor interface 902 may send communications (e.g., infrared images in the form of analog voltages or digital data values) to image processing blocks 904. In addition, infrared sensor interface 902 may receive communications (e.g., digital data values) from memory interface 906.

In various embodiments, infrared sensor interface 902 may provide voltage rails, clocks, synchronization information, and calibration data (e.g., biasing information) to infrared sensor assembly 128. For example, in one embodiment, infrared sensor interface 902 may be implemented with hard coded state machines to control communications between infrared sensor assembly 128 and processing module 160.

In another embodiment, calibration data may be stored in non-volatile memory 912, accessed from non-volatile memory 912 by CPU 910, stored by CPU 910 in volatile memory 908 through memory interface 906, accessed from volatile memory 908 by infrared sensor interface 902 through memory interface 906, and provided to infrared sensor assembly 128 by infrared sensor interface 902.

Image processing blocks 904 may perform various image processing operations on captured infrared images (e.g., image data provided in the form of pixel values or other appropriate forms) captured by infrared sensor assembly 128.

Memory interface 906 may be used to support communications between image processing blocks 904, volatile memory 908, and CPU 910. Non-volatile memory 912 may be used by image processing blocks 904 and CPU for storage of data and/or software instructions.

CPU 910 may be used, for example, to coordinate (e.g., manage) the processing performed by image processing blocks 904 and the interfacing between processing module 160 and host device 102.

I2C interface 914 may be used to support communications between CPU 910 and host device 102. MIPI interface 916 may be used to support communications between image processing blocks 904 and other components of infrared imaging module 100 and/or host device 102.

LDO regulators 918 may be used to regulate voltages of various components of system architecture 900 and/or other components of infrared imaging module 100 (e.g., LDO regulators 918 may perform voltage regulation to reduce power supply noise introduced to infrared sensor assembly 128). Other components 920 may be used, for example, to provide various ports and interfaces, and perform clocking, synchronization, supervisor and reset operations, and other operations for system architecture 900.

In operation, infrared sensor interface 902 may receive infrared images from infrared sensor assembly 128. In one embodiment, infrared sensor assembly 128 may include appropriate analog-to-digital converter circuitry to convert analog voltages provided by its ROIC into digital data values provided to infrared sensor interface 902. In another embodiment, such infrared images may be received from the ROIC of infrared sensor assembly 128 as analog voltages and converted into digital data values by infrared sensor interface 902 for further processing by image processing blocks 904. In another embodiment, infrared sensor interface 902 may pass such analog voltages to image processing blocks 904 which may convert the analog voltages to digital data values for further processing. After conversion of the infrared images into digital form, they may be processed by image processing blocks 904 using various processing techniques as discussed.

Accordingly, it will be appreciated that the combination of infrared sensor assembly 128 and system architecture 900 may provide a combined analog/digital system in which infrared images are captured in analog form (e.g., by infrared sensor assembly 128) and processed digitally (e.g., by system architecture 900). Processed infrared images may be provided to host device 102 in digital form through I2C interface 914.

Figure 10:
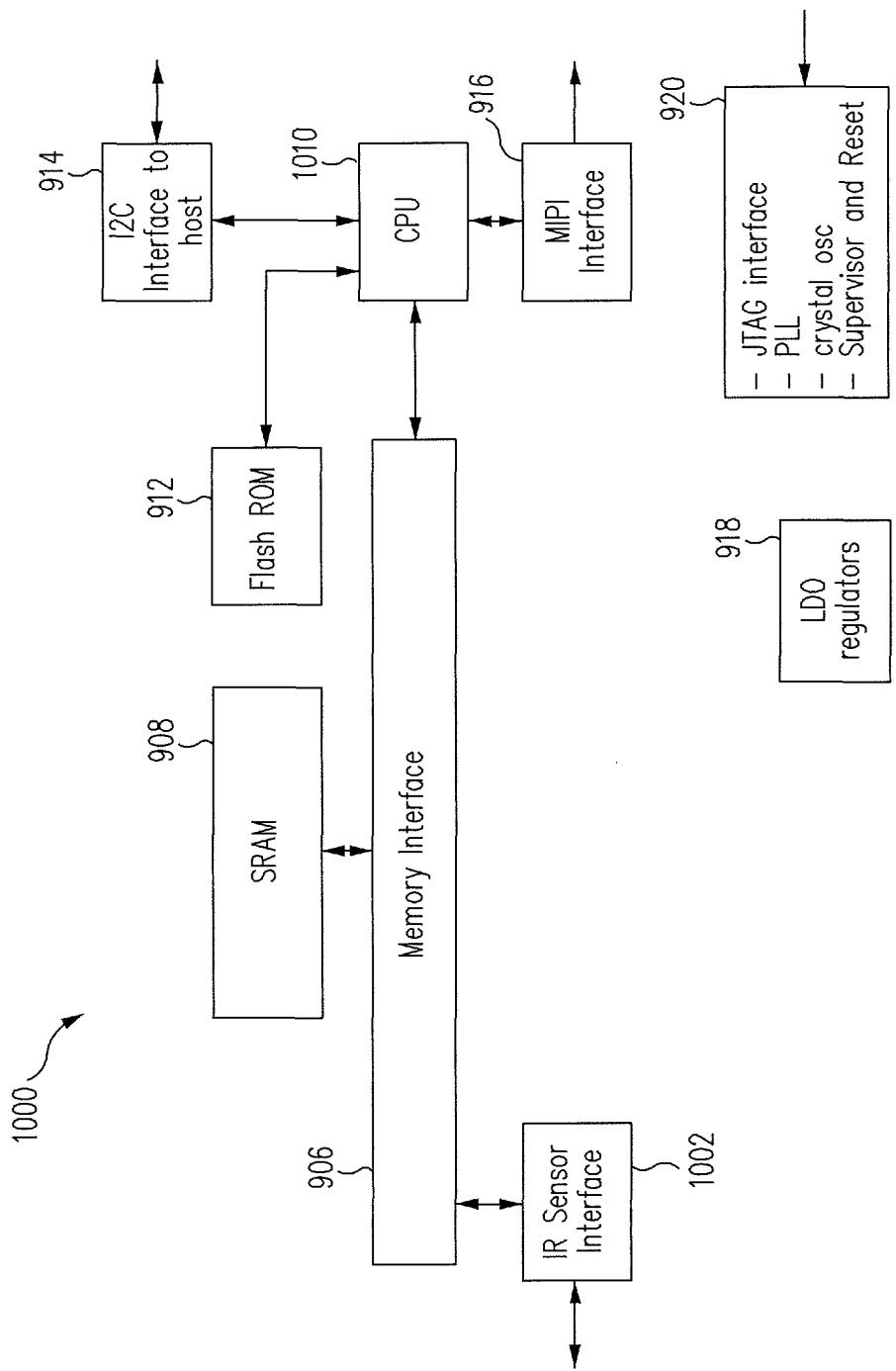
FIG. 10 illustrates a block diagram of another system architecture used to implement a processing module of an infrared imaging module in accordance with an embodiment of the disclosure.

FIG. 10 illustrates a block diagram of another system architecture 1000 used to implement processing module 160 of infrared imaging module 100 in accordance with an embodiment of the disclosure. It will be appreciated that system architecture 1000 includes various components of system architecture 900 which may be operated in the same or similar fashion as previously discussed.

However, in system architecture 1000, image processing blocks 904 are not provided. Instead, the image processing features provided by image processing blocks 904 may be performed instead by a CPU 1010 in system architecture 1000. In this regard, system architecture 1000 may be viewed as a CPU-centric system architecture that may be scaled and configured to perform any desired infrared image processing tasks by configuring CPU 1010 with appropriate software. In addition, by using CPU 1010, advanced power management features may be provided and implementation costs may be reduced over other system architectures.

Also in system architecture 1000, an infrared sensor interface 1002 may be provided in place of infrared sensor interface 902. In this regard, infrared sensor interface 1002 may send and receive communications (e.g., infrared images in the form of digital data values) to and from memory interface 906. Infrared sensor interface 1002 may be further configured to operate in the manner described with regard to infrared sensor interface 902.

In operation, CPU 1010 may perform digital processing of infrared images in accordance with various techniques described herein. In this regard, analog voltages provided by the ROIC of infrared sensor assembly 128 may be converted into digital data values using appropriate analog-to-digital converter circuitry of image sensor assembly 128 or of infrared sensor interface 1002. Infrared sensor interface 1002 may pass digital data values corresponding to infrared images to memory interface 906 for storage in volatile memory 908 for further use by CPU 1010.

In various embodiments of system architectures 900 and 1000, processing blocks 904, CPU 910, and/or CPU 1010 may be implemented by, for example, one or more ASICs, general purpose CPUs, FPGAs, and/or other types of processing and/or logic circuits as may be desired in particular implementations.

In various embodiments, system architectures 900 and 1000 may be used to abstract the operations of infrared imaging module 100 from host device 102. In this regard, manufacturers and software developers for host device 102 may receive infrared images from infrared imaging module 100 without requiring knowledge of image detection and processing operations.

In various embodiments, infrared sensors 132, ROIC, and other components of infrared sensor assembly 128 may be implemented to support high image capture rates. For example, in one embodiment, infrared sensor assembly 128 may capture infrared images at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132.

In one embodiment, such infrared images may be provided from infrared sensor assembly 128 to processing module 160 at a high frame rate (e.g., 240 Hz or other frame rates). In another embodiment, infrared sensor assembly 128 may integrate over multiple time periods to provide integrated (e.g., averaged) infrared images to processing module 160 at a lower frame rate (e.g., 30 Hz, 9 Hz, or other frame rates).

Processing module 160 (e.g., implemented by system architecture 900 or 1000, or any other appropriate system architecture) may perform various processing on infrared images received from infrared sensor assembly 128. Such processing may be performed in accordance with various digital infrared image processing techniques including, for example, image filtering, temporal filtering, digital integration, pixel or image averaging, image smoothing, determining sensor frame based coefficients, determining temperature corrections, determining factory and scene based non-uniformity corrections, determining bad pixels and replacing pixel data for such bad pixels, automatic gain control (AGC) and/or other techniques. The resulting processed images provided by processing module 160 to host device 102 may be at a lower frame rate (e.g., 60 Hz, 30 Hz, 9 Hz, or other frame rates) than the infrared images received from infrared sensor assembly 128.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A device comprising:
   an infrared imaging device comprising:
   a housing configured to engage with a socket;
   a focal plane array within the housing, wherein the focal plane array comprises a plurality of microbolometers, wherein each of the plurality of microbolometers is configured to capture infrared image data from a target scene; and
   a logic circuit within the housing and configured to process the captured infrared image data.

2. The device of claim 1, further comprising a plurality of electrical connections on an inside surface of the housing and configured to pass electrical signals from the focal plane array to the logic circuit.

3. The device of claim 2, wherein at least a portion of the plurality of electrical connections protrudes from a bottom surface of the housing.

4. The device of claim 2, further comprising:
   a first circuit board in electrical contact with the focal plane array and the plurality of electrical connections; and
   a second circuit board in electrical contact with the logic circuit and the plurality of electrical connections,
   wherein the plurality of electrical connections and the first and second circuit boards are configured to pass the electrical signals from the focal plane array to the logic circuit.

5. The device of claim 4, wherein the logic circuit is mounted to the second circuit board by flip chip connections and/or a plurality of wire bonds.

6. The device of claim 1, further comprising an optical element coupled to the housing and configured to pass infrared energy through to the focal plane array.

7. The device of claim 6, wherein the optical element comprises a lens, and wherein the lens is at least partially within the housing.

8. The device of claim 1, wherein the housing is configured to engage with the socket to secure the infrared imaging device within the socket when the infrared imaging device is inserted into a cavity of the socket.

9. The device of claim 1, wherein the device further comprises the socket, wherein the infrared imaging device is substantially within the socket, wherein the socket is coupled to the device such that the infrared imaging device is configured as an infrared camera for the device, and wherein the device is a portable host device.

10. The device of claim 9, wherein the portable host device is a mobile telephone.

11. The device of claim 1, further comprising a shutter adapted to be selectively positioned in front of the infrared imaging device to block infrared energy external to a host device from the focal plane array, wherein each of the plurality of microbolometers is configured to capture the infrared image data from a respective portion of the target scene, wherein the plurality of microbolometers forms an array of N microbolometers by M microbolometers, and wherein N and M are integers greater than or equal to 32 and less than or equal to 640.

12. A method of making the device of claim 1, the method comprising:
engaging the housing with the socket to secure the infrared imaging device within the socket; and
coupling the socket to a host device.

13. A method comprising:
passing infrared energy to an infrared imaging device of a device, wherein the infrared imaging device comprises a housing configured to engage with a socket;
capturing infrared image data associated with a target scene from the passed infrared energy through each of a plurality of microbolometers of a focal plane array within the housing; and
providing electrical signals from the focal plane array to a logic circuit within the housing.

14. The method of claim 13, wherein the electrical signals are provided through a plurality of electrical connections on an inside surface of the housing.

15. The method of claim 14, wherein the infrared imaging device further comprises:
a first circuit board in electrical contact with the focal plane array and the plurality of electrical connections; and
a second circuit board in electrical contact with the logic circuit and the plurality of electrical connections,
wherein the electrical signals are provided through the plurality of electrical connections, the first circuit board, and the second circuit board, and
wherein the logic circuit is mounted to the second circuit board by flip chip connections and/or a plurality of wire bonds.

16. The method of claim 13, wherein the passing comprises passing the infrared energy through an optical element coupled to the housing.

17. The method of claim 16, wherein the optical element comprises a lens, and wherein the lens is at least partially within the housing.

18. The method of claim 13, wherein the device further comprises the socket, wherein the infrared imaging device is substantially within the socket, wherein the socket is coupled to the device such that the infrared imaging device is configured as an infrared camera for the device, and wherein the device is a portable host device.

19. The method of claim 13, further comprising selectively positioning a shutter of the device in front of the infrared imaging device to block infrared energy external to the device from the focal plane array.

20. The method of claim 13, wherein the housing engages with the socket to secure the infrared imaging device within the socket when the infrared imaging device is inserted into a cavity of the socket.

* * * * *

UNITED STATES PATENT AND TRADEMARK OFFICE
CERTIFICATE OF CORRECTION

PATENT NO. : 10,230,910 B2
APPLICATION NO. : 15/665277
DATED : March 12, 2019
INVENTOR(S) : Pierre Boulanger et al.

Page 1 of 1

It is certified that error appears in the above-identified patent and that said Letters Patent is hereby corrected as shown below:

In the Specification

In Column 9, Line 48, in Table 1, change "FIG. SE" TO --FIG. 5E--

Signed and Sealed this
Twenty-eighth Day of April, 2020

Andrei Iancu
*Director of the United States Patent and Trademark Office*